Patented Mar. 14, 1950

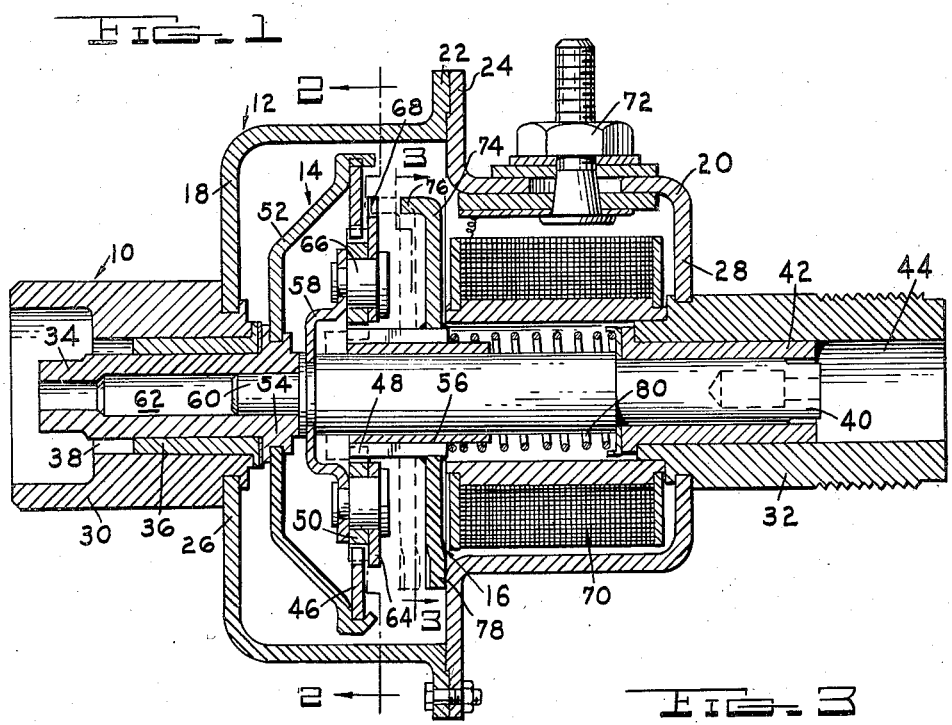
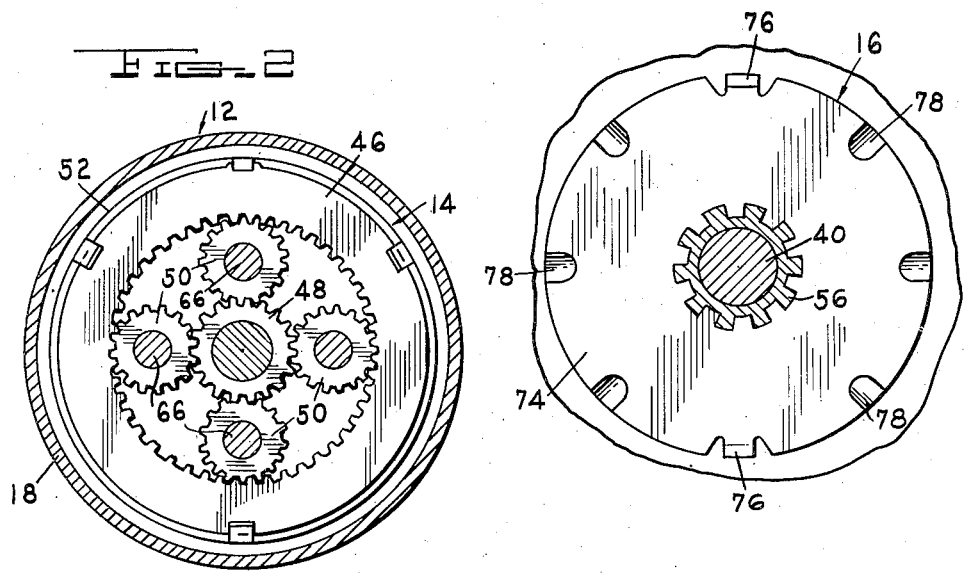

2,500,447

UNITED STATES PATENT OFFICE 2,500,447

CHANGE-SPEED GEARING

Fred Bitzer, Cleveland, Ohio, assignor to Eaton Manufacturing Company, Cleveland, Ohio, a corporation of Ohio Application May 6, 1948, Serial No. 25,370

4 Claims. (Cl. 74—781)

This invention relates to power transmitting gearing and more particularly to an electromagnetically controlled change speed gearing.

Broadly the invention comprehends the provision of a power transmitting speed change gearing comprising a simple planetary gearing system having electromagnetic control means therefor providing for different ratios of drive therethrough.

An object of the invention is the provision of a simple and economically constructed speed change device.

Another object of the invention is the provision of a change speed gearing for effective electromagnetically actuated control means therefor.

Another object of the invention is the provision of a change speed device comprising a planetary gear set arranged intermediate and coupling the input and output members thereof having quick responsive electromagnetically actuated shift means associated therewith for controlling the ratio drive of the device.

A further object of the invention is the provision of a planetary gear system change speed device having a simple electromagnetically actuated control means therefor.

A yet further object of the invention is the provision of a simple compact and lubricant enclosed change speed gearing mechanism.

Other objects and advantages of the invention will appear from the following description taken in connection with the drawings, forming a part of the specification, and in which:

Fig. 1 is a vertical, cross-sectional view of a change speed device;

Fig. 2 is a cross-sectional view taken substantially along lines 2—2 of Fig. 1; and Fig. 3 is a cross-sectional view taken substantially along lines 3—3 of Fig. 1.

The present invention is directed at the provision of a change speed device of simple and compact design and which is effective in operation. The device comprises primarily a planetary gear system having electromagnetically actuated control means associated therewith effective to permit of either a direct 1 to 1 or ratio drive of the device upon the engagement or disengagement thereof from the planetary gear system. The electromagnetically actuated control means is especially of novel construction permitting of an immediate shifting thereof for an effective and efficient gear ratio change operation upon energization or deenergization of the electromagnetic actuation as the case may be.

Referring to the drawings for more specific details of the invention, 10 represents generally a change speed power transmitting gear mechanism comprising a gear housing 12, a planetary gear system 14, and a change speed control mechanism 16.

The housing 12 includes a pair of cup-shaped members 18 and 20 respectively suitably secured together at flanged ends 22 and 24 respectively thereof and having fixedly supported at axially oppositely disposed ends 26 and 28 thereof hub members 30 and 32 respectively, the purpose of which will hereinafter appear.

The planetary gear system 14 is supported within housing 12 and includes a shaft 34 journalled in a bushing 36 fitted in an axial opening 38 provided in hub member 30, a shaft 40 journalled in a bushing 42 fitted in an axial opening 44 in hub member 32 concentric to opening 38 and a planetary gear set comprising a ring gear 46, a sun gear 48, and a plurality of pinion gears 50 arranged in meshing engagement between the ring and sun gears.

The ring gear 46 is fixedly held in an annular plate 52 which is fixedly mounted upon one end 54 of shaft 34 whereas sun gear 48 forms a part of a sleeve member 56 mounted for free rotation and axial movement on shaft 40.

The planet pinion gears 50 are mounted for rotation in spaced circumferential relation upon an annular plate member 58 which is in turn fixedly mounted upon an extension of shaft 40, and end 60 adjacent thereto being rotatably supported in a central bore 62 extending through shaft 34. An annular plate 64 is mounted upon shafts 66 supporting the pinion gears 50 disposed on the opposite side of the gears from plate 58 and provides one or more radial lugs or ears 68 circumferentially spaced upon the plate 64, the purpose of which will hereinafter appear.

The control mechanism 16 includes an annular electro-magnetic coil 70 mounted fixedly secured to one end of hub 32, said coil being connected to a suitable source of electrical current by way of a current supply terminal 72 insulatedly mounted upon cup-shaped housing member 20 and an armature ring 74 adapted to cooperate with the coil and the magnetic circuit formed thereby.

The ring 74 is mounted at its inner radial end in fixed relation upon sleeve 56 for movement therewith and provides at its outer circumference a pair of axially extending equal circumferentially spaced fingers 76 adapted to cooperate with ear 68 on plate 64 for one extreme axial position of sleeve 56 and a plurality of equal annularly spaced detents 78 adapted to engage the vertical inner wall of housing member 20 in the other extreme axial position of sleeve 56.

The sleeve 56 and armature ring 74 are normally axially biased away from coil 70 by a tension spring 80 arranged axially between the sleeve and inner end of hub 32.

In view of the arrangement of the coil relative to housing member 22 and armature ring 74 and the provision that the housing be of magnetic material, a magnetic circuit is provided about the coil wherein the vertical wall of housing member 20 at the contact points with the detents 78 of armature ring 74 form outer pole faces adapted to attract the armature ring into contact therewith upon energization of the coil. The detents 78 further provide an air gap of predetermined width at the inner pole face of the coil.

It is to be noted that for economy of construction, the housing members 18 and 20, plates 52, 58, and 64, ring gear 46, pinion gears 50, and armature ring 74 are all stamped from sheet metal stock.

The mechanism 10 is so constructed that upon the assembly of the component parts thereof a predetermined amount of prescribed lubricant is placed in the housing so as to provide for ample lubrication for the movement of the parts of the mechanism without the necessity of periodic lubrication thereafter for the satisfactory operation thereof.

In a normal operation of the mechanism 10 wherein it is to be used as a change speed power transmitting mechanism for producing a direct drive under one condition of control and a reduced ratio speed in its other operating phase wherein the coil is deenergized, a driving force which is delivered to shaft 34 from a source, not shown, results in rotating ring gear 46 at the same rate of speed as the shaft. With the coil deenergized, the sleeve 56 is axially biased away from the coil resulting in the locking engagement of armature ring 74 and plate 64 through the cooperating engagement of ear 68 and fingers 76 as shown by dotted lines in Fig. 1. The rotation of ring gear 46 which is transmitted to pinion gears 50 causes no relative rotation therebetween because of the locked-up condition of the pinion gears and plate 64 through the action of the sun gear 58 and armature ring 74 as a fixed part of sleeve 56. Because of this lock up of the ring, pinion, and sun gears, the driving force of the ring gear is transmitted directly to the shaft 40 resulting in rotating it at a like speed to the shaft 34 for delivery to any suitable mechanism adapted to be driven thereby.

When it is desired to cause a speed reduction of mechanism 10, the coil is energized resulting in setting up a magnetic circuit which through the pole faces is formed on the vertical wall of housing member 20. The armature is attracted thereto and moved axially against the resistance of spring 80 effecting disengagement of the ear 68 and fingers 76 but at the same time resisting rotation of sun gear 48 through the magnetic holding force produced between the pole faces and the detents 78 on the armature ring. Because of the arrangement of the detents at the outermost circumference of the ring, a maximum lever arm and effective holding means for resisting rotation of the sun gear is provided. It is to be noted that the sun gear remains in engagement with the pinion gears 50 for both axial positions of the sleeve 56. With the sun gear in locked, non-rotative condition the speed of rotation of shaft 34 is transmitted at a reduced rate through the ring gear and pinion gears, rolling upon stationary sun gear 48, to the shaft 40 for the delivery therefrom. The speed reduction obtained is predetermined by the ratio established between the various gears.

When it is again desired to shift the gearing back to direct drive, it is only necessary that the coil be deenergized whereupon the spring 80 effects a quick release of the armature ring from engagement with the pole faces of the magnetic circuit and moves same to engagement with plate 64 as previously described. The armature ring is quickly responsive to release from the pole faces upon deenergization of the coil inasmuch as by controlling the magnetism to the spaced circumferential points of the detents 78 in cooperation with the pole faces of the magnetic circuit the residual magnetism present is a minimum and is overcome in a simple, quick manner.

It is to be recognized that if it might be desirable to utilize the change speed device for the purpose of overdrive it is only necessary that the input and output relationship of the shafts 34 and 40 be reversed wherein the shaft 40 would assume the relationship of input shaft to the output shaft 34 as compared to the reduced reduction speed ratio hereinbefore described.

While this invention has been described in connection with certain specific embodiments, the principle involved is susceptible of numerous applications that will readily occur to persons skilled in the art.

What I claim is:

1. Change speed gearing comprising a housing, a shaft journalled in one end of the housing, a second shaft journalled in the other end of the housing, a ring gear fixed to the first shaft, a plurality of pinion gears mounted for rotation on the second shaft, a plate secured upon the axes of the pinion gears having a plurality of radially outwardly extending ears on the outer periphery thereof, a sun gear having meshing and sliding engagement with the pinion gears, an electromagnetic coil mounted in stationary relation in the housing providing a magnetic circuit therewith, an armature fixedly mounted on the sun gear having a plurality of axially extending fingers at the outer periphery thereof extending in the direction of the plate and adapted to cooperate with the ears thereon, a plurality of circumferentially spaced axially extended detents on the face thereof axially disposed from the fingers cooperable in friction surface contacting relation with a pole face for the coil, spring means normally biasing the sun gear and armature away from the coil providing interlocking of the ears and fingers of the plate and armature respectively and a source of electrical current for the coil, said coil effective upon the energization thereof to attract and move the armature axially so as to disengage the ears and fingers of the plate and armature respectively and simultaneously inhibit rotation of the armature.

2. Change speed gearing comprising a housing, a shaft supported for rotation in the housing, a second shaft supported for rotation in the housing and extending into telescoping supported relation with the other shaft, a ring gear fixed upon the first shaft for rotation therewith, a plurality of pinion gears supported for rotation on the second shaft in meshing engagement with the ring gear, an annular plate mounted on the pinion gears having circumferentially spaced ears extending radially outwardly therefrom, a sleeve mounted for free rotation on and axially slidable relative to the second shaft, a sun gear on said sleeve in meshing engagement with the pinion gears, an electromagnetic coil fixedly secured in the housing section, an armature ring fixedly secured on the sleeve axially spaced from the sun gear, said ring, adapted to cooperate with the coil upon the energization thereof, having circumferentially spaced fingers on the outer periphery thereof for cooperative engagement with the ears of the annular plate, spring means normally axially biasing the armature away from the coil providing for engagement of the ears and fingers, a plurality of circumferentially spaced detents axially extended on the outer periphery thereof on the opposite side from the fingers for planar surface contacting engagement with the pole face of the magnetic circuit produced by the coil, spring means normally biasing the ring away from the coil and a source of electrical current for energizing the coil, said coil upon the energization thereof effective to move the armature axially, also to disengage the ears from the fingers and provide for the contacting engagement of the detents upon the pole face of the magnetic circuit.

3. Change speed mechanism comprising a rotatable shaft, a second rotatable shaft in aligned telescoped relation thereto, a planetary gearing system coupling the shafts together comprising a ring gear, pinion gears mounted on a carrier and a sun gear, said ring and sun gears being in continuous meshing engagement with the pinion gears, a housing supporting the shafts and gears for rotation therein, an electromagnetic coil affixedly arranged in the housing in encompassing relation to one of the shafts and providing with a portion of the housing a magnetic flux circuit with a radial inner flat face of the housing as a pole face therefor radially outwardly disposed of the coil, an armature ring fixedly secured to the sun gear, extending radially axially disposed between the planetary gearing system and coil and movable axially therebetween with the sun gear, means on the outer periphery of the ring engageable with the pinion gear carrier for locking the pinion and sun gears together and other means on the ring near the outer periphery thereof oppositely disposed from the first means adapted to engage the pole face on the housing at circumferentially spaced points.

4. Change speed mechanism comprising a rotatable shaft, a second rotatable shaft, a planetary gearing system coupling the shafts together comprising a ring gear, pinion gears and sun gear, an armature disc fixedly secured to the sun gear and movable axially therewith relative to the pinion gears, means on the armature disc for locking the sun and pinion gears together, spring means normally biasing the armature toward locking relation of the sun and pinion gears, an electromagnetic coil normally axially spaced from the armature providing an annular pole face cooperable with the armature and a source of electrical current for the coil, said armature having circumferentially spaced axial projections thereon engageable in spaced contacting relation along a radial plane extending perpendicular to the axis of the armature disc for spacing the major face portion of the armature a predetermined distance from the annular pole face upon the energization of the coil attracting the armature toward the coil against the resistance of the spring means effective to disengage the sun and pinion gears from locked relation and resist rotation of the sun gear.

FRED BITZER.

REFERENCES CITED

The following references are of record in the file of this patent:

UNITED STATES PATENTS

| Number | Name | Date |
|---|---|---|
| 1,802,630 | Cotal | Apr. 28, 1931 |
| 2,312,263 | Ormsby | Feb. 23, 1943 |
| 2,319,226 | Griswold | May 18, 1945 |

FOREIGN PATENTS

| Number | Country | Date |
|---|---|---|
| 219,929 | Great Britain | Mar. 6, 1924 |